(12) United States Patent
Tippmann, Jr. et al.

(10) Patent No.: US 8,726,798 B2
(45) Date of Patent: May 20, 2014

(54) RADIANT LIQUID HEATING CONTAINER

(75) Inventors: Vincent Paul Tippmann, Jr., Fort Wayne, IN (US); Jay Paul Tippmann, Fort Wayne, IN (US)

(73) Assignee: Thermodyne Foodservice Products, Inc., Fort Wayne, IN (US)

( * ) Notice: Subject to any disclaimer, the term of this patent is extended or adjusted under 35 U.S.C. 154(b) by 0 days.

(21) Appl. No.: 13/449,020

(22) Filed: Apr. 17, 2012

(65) Prior Publication Data

US 2012/0204856 A1 Aug. 16, 2012

Related U.S. Application Data

(63) Continuation of application No. 12/149,682, filed on May 6, 2008, now abandoned.

(60) Provisional application No. 60/916,434, filed on May 7, 2007.

(51) Int. Cl.
*A23C 3/07* (2006.01)

(52) U.S. Cl.
USPC ............................................. 99/451

(58) Field of Classification Search
None
See application file for complete search history.

(56) References Cited

U.S. PATENT DOCUMENTS

| | | | | |
|---|---|---|---|---|
| 1,944,303 A * | 1/1934 | Rush | ................................ | 99/314 |
| 2,025,333 A * | 12/1935 | Richheimer | ................ | 126/377.1 |
| 2,292,430 A * | 8/1942 | Charlston | ......................... | 99/290 |
| 2,809,577 A * | 10/1957 | Sill | .................................. | 99/306 |
| 3,020,823 A * | 2/1962 | Musso | ............................ | 99/287 |
| 3,231,717 A * | 1/1966 | Moorhead | ..................... | 219/441 |
| 3,809,063 A * | 5/1974 | Hajnal | ........................ | 126/376.1 |
| 4,143,590 A * | 3/1979 | Kasakoff | ......................... | 99/296 |
| 4,642,443 A * | 2/1987 | Jorgensen et al. | ............. | 219/689 |
| 5,215,794 A * | 6/1993 | Johnson | ....................... | 428/35.8 |
| 5,539,856 A * | 7/1996 | Andrew et al. | ................ | 392/467 |
| 5,765,467 A * | 6/1998 | Levine et al. | .................... | 99/282 |
| 5,782,163 A * | 7/1998 | Chang | ............................. | 99/281 |
| 5,968,618 A * | 10/1999 | Miller | ........................... | 428/34.6 |
| 6,327,429 B1 * | 12/2001 | Chan | ............................... | 392/483 |
| 6,505,752 B1 * | 1/2003 | Rolfes et al. | ............... | 220/592.16 |
| 6,655,261 B1 * | 12/2003 | Horstmann | ...................... | 99/319 |
| 6,974,051 B1 * | 12/2005 | Lin | .................................. | 222/25 |
| 7,299,955 B2 * | 11/2007 | Pelkey et al. | .............. | 222/465.1 |
| 7,444,924 B2 * | 11/2008 | Laigneau et al. | ............... | 99/280 |
| 2010/0089246 A1 * | 4/2010 | Yang | ............................... | 99/403 |

FOREIGN PATENT DOCUMENTS

EP 0 477 669 A1 4/1992
GB 2 329 573 A 3/1999

* cited by examiner

*Primary Examiner* — Kurt Fernstrom
*Assistant Examiner* — Dolores Collins
(74) *Attorney, Agent, or Firm* — Birch, Stewart, Kolasch & Birch, LLP

(57) ABSTRACT

A radiant liquid heating device includes a container for holding a liquid. The container includes an opening for dispensing the fluid and a closed bottom. A base member is mounted relative to the closed bottom. The base member is spaced a predetermined distance relative to the closed bottom to provide an air gap there between. The base member is exposed to a heat source wherein the base member shields the bottom of the container from being in direct contact with the heat source to provide a source of radiant heat for maintaining a liquid disposed within the container at a predetermined temperature.

19 Claims, 4 Drawing Sheets

RADIANT LIQUID HEATING CONTAINER

CROSS-REFERENCE TO RELATED APPLICATIONS

The present application is a continuation of a application Ser. No. 12/149,682 filed May 6, 2008, now abandoned and it also claims priority to the application Ser. No. 12/149,682. In addition, it incorporates by reference all the original filing and teachings of the parent application Ser. No. 12/149,682. In turn, the parent application Ser. No. 12/149,682 claims priority to the U.S. Provisional Patent Application No. 60/916,434, filed on May 7, 2007, the entire contents of which are hereby incorporated by reference.

BACKGROUND OF THE INVENTION

1. Field of the Invention

The present invention relates to a radiant liquid heating container wherein a base member is mounted relative to the bottom of the container with a predetermined space providing an air gap between the container and the base for maintaining a liquid disposed within the container at a predetermined temperature.

2. Description of Background Art

Hithertofore, a container for maintaining a liquid at a predetermined temperature is normally exposed directly to a heat source. After the liquid is heated on the heat source for a certain period of time, the liquid in the container may be burned by the direct contact of the container relative to the heat source. This is a particular problem with respect to coffee that is brewed and thereafter exposed directly to a heat source. The heat source makes point contact with the container to burn certain portions of the coffee.

More specifically, a liquid product, such as coffee, is maintained in a heated condition by placing the container holding the liquid directly on a heat source, such as a burner. Normally, three points of contact are made between the container and the burner for conducting the heat of the burner to the container. At the points of contact with the burner, the container is heated to a very high temperature that results in a burning of the liquid within the container. When coffee is disposed in the container, the coffee is burned and the liquid within the container is boiled off to produce a coffee product that is not fit for consumption.

In addition, a thermos may be used for storing a heated liquid. However, with time the liquid within the thermos will cool and thus become unsuitable for consumption.

SUMMARY AND OBJECTS OF THE INVENTION

It is an object of an embodiment of the present invention to provide a radiant heater for maintaining a liquid within a container at a predetermined temperature without adversely affecting the taste of the liquid.

It is another object of an embodiment of the present invention to provide a radiant heater for maintaining a liquid within a container at a predetermined temperature by displacing the container to form a gap between the container and a base member for heating the container by use of radiant heat while eliminating the point contact between the container and the burner.

These and other objects of the invention are achieved by providing a radiant liquid heating container that includes a container for holding a fluid with an opening for dispensing the fluid and a closed bottom. A base member is mounted relative to the closed bottom. The base member is spaced a predetermined distance relative to the closed bottom to provide an air gap there between. The base member is exposed to a heat source wherein the base member shields the bottom of the container from being in direct contact with the heat source to provide a source of radiant heat for maintaining a liquid disposed within the container at a predetermined temperature.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
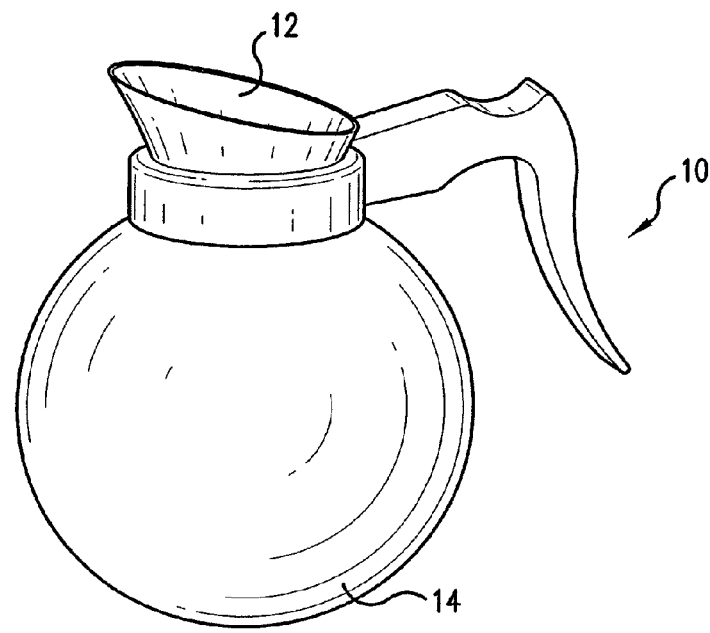
FIG. 1 is a perspective view of a container for heating a liquid.
Figure 2:
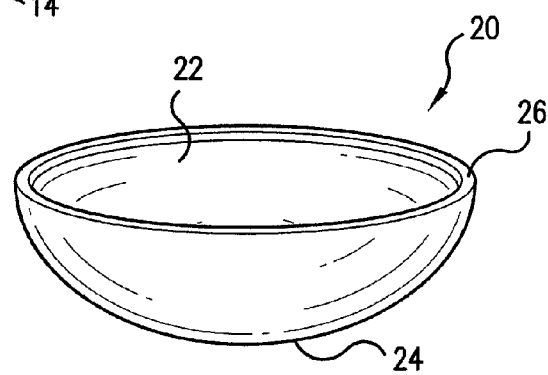
FIG. 2 is a perspective view of a base member that is formed to fit the bottom of the container illustrated in FIG. 1.
Figure 3:
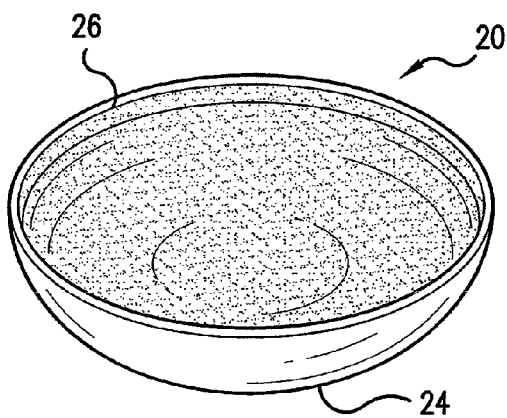
FIG. 3 is a perspective view of the base member with a dark surface coating the interior of the base member.

FIG. 1 illustrates a container 10 for holding a liquid. The container 10 includes an opening 12 for dispensing the liquid and a closed bottom 14. FIGS. 2 and 3 illustrate a base member 20 for mounting relative to the container 10. The base member 20 includes an interior surface 22 with a circumferential surface 26 and a closed bottom 24. As illustrated in FIG. 3, the interior surface may be coated with a non-reflective material 26.

Figure 4:
FIG. 4 is an exploded view illustrating the container being mounted on the base member.
Figure 5:
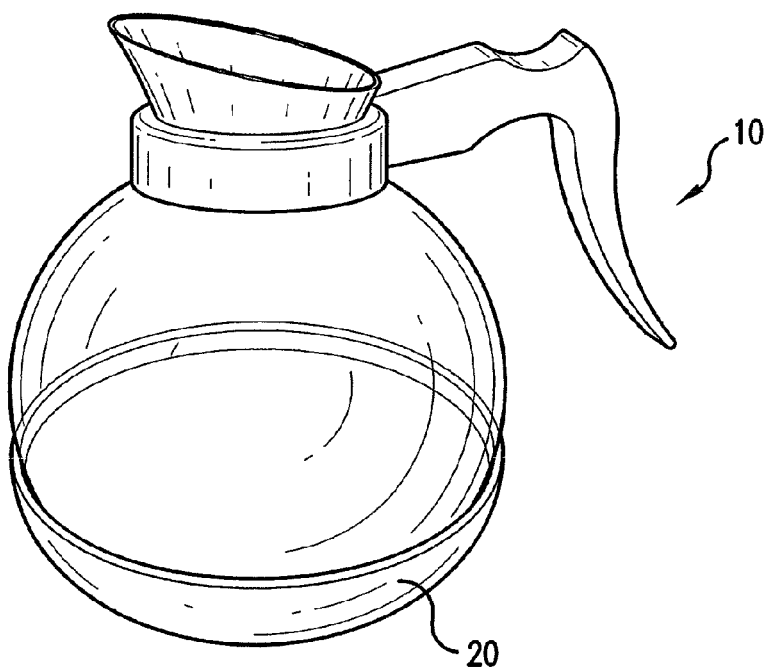
FIG. 5 is a perspective view illustrating the container with the base member being secured relative thereto.
Figure 6:
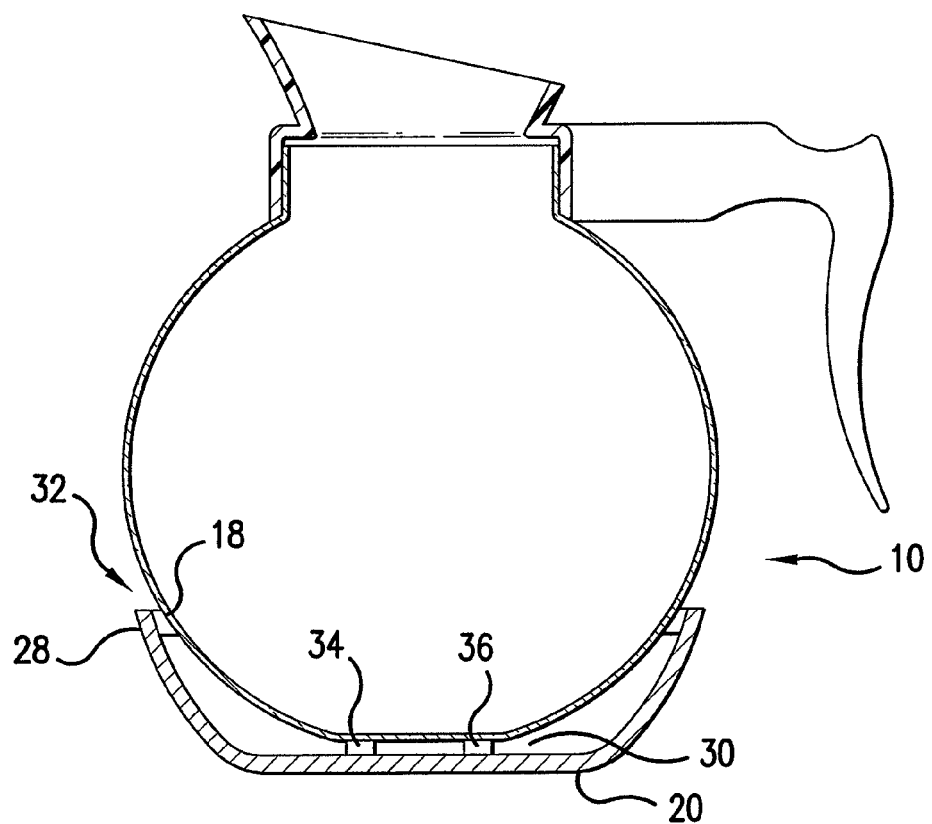
FIG. 6 is a cross-sectional view of the container and the base member illustrating the gap that is formed between the bottom of the container and the base member.

As illustrated in FIGS. 4 and 5, the base member 20 is adapted to be mounted relative to the closed bottom 14. As illustrated in FIG. 6, the base member 20 is spaced a predetermined distance 30 relative to the closed bottom 14 to provide an air gap there between. In one embodiment of the invention, the gap may be ¼ of an inch, 0.625 cm.

The base member 20 is adapted to be exposed to a heat source, such as an electric heater with a certain watt/density of heat being supplied to the plate that is mounted on the heat source. The base member 20 shields the bottom 14 of the container 10 from being in direct contact with the heat source to provide a source of radiant heat for maintain a liquid disposed within said container 10 at a predetermined temperature.

In an embodiment of the invention, the container 10 may be constructed of glass and the base member 20 may be constructed of aluminum or any other suitable metallic material.

The interior surface 22 of said base member 20 is coated with a non-reflecting surface 26 for enhancing the transmission of radiant heat transmitted to the container 10. The non-reflecting surface 26 may be black paint or any material for aiding in the transmission of radiant heat to the container 10.

The base member 20 may be sealed relative to the container 10 for forming a water proof and air tight gap disposed between the closed bottom 14 of the container 10 and the interior surface 22 of the base member 20. The seal may be constructed of plastic or the seal may be a silicone seal.

The base member 20 includes an outer circumferential surface 28 for engaging an outer circumferential surface 18 of the container 10 at a predetermined point 32. The predetermined point 32 is displaced upwardly from a bottom portion 24 of the base member 20 to prevent spot heating of a liquid disposed within the container 10.

In one embodiment of the invention, the base member 20 is removably mounted relative to the container 10 to permit removal of the base member 20 from the container 10 for cleaning. In addition, spacer members 34, 36 may be disposed between the base member 20 and the container 10 for maintaining the gap there between.

Figure 7:
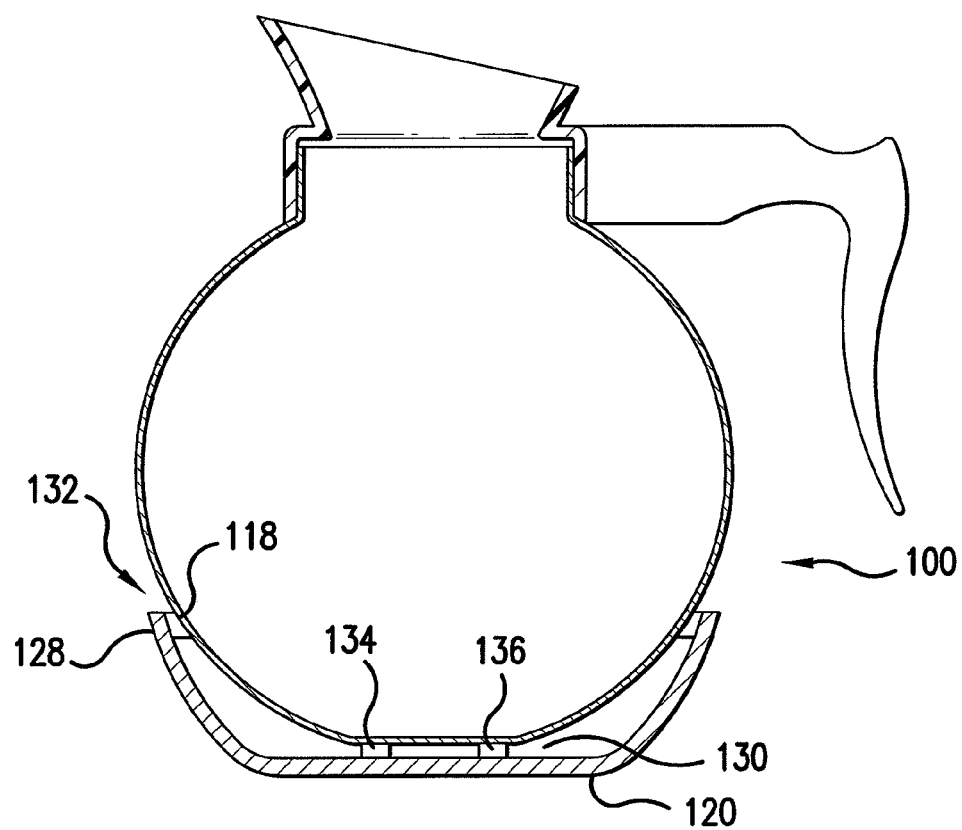
FIG. 7 is a cross-sectional view of a metal container with a base member illustrating the gap that is formed between the bottom of the container and the base member.

As illustrated in FIG. 7, the container 100 may be constructed of metal and the base member 120 may be constructed of aluminum or any other suitable metallic material.

The interior surface 122 of said base member 120 is coated with a non-reflecting surface 126 for enhancing the transmission of radiant heat transmitted to the container 100. The non-reflecting surface 126 may be black paint or any material for aiding in the transmission of radiant heat to the container 100.

The base member 120 may be sealed relative to the container 100 for forming a water proof and air tight gap disposed between the closed bottom 114 of the container 100 and the interior surface 122 of the base member 120. The seal may be constructed of plastic or the seal may be a silicone seal.

The base member 120 includes an outer circumferential surface 128 for engaging an outer circumferential surface 118 of the container 100 at a predetermined point 132. The predetermined point 132 is displaced upwardly from a bottom portion 124 of the base member 120 to prevent spot heating of a liquid disposed within the container 100.

The base member 120 illustrated in FIG. 7 may be removably mounted relative to the container 100 to permit removal of the base member 120 from the container 100 for cleaning. In addition, spacer members 134, 136 may be disposed between the base member 120 and the container 100 for maintaining the gap there between.

The invention permits a liquid disposed with the container 10, 100 to be maintained at a predetermined temperature by use of radiant heat and not conductive heat. By using radiant heat to maintain a liquid such as coffee at a predetermined temperature the present invention avoids problems in the prior art wherein the coffee is burned by using conduction to heat at least three points on the bottom of the container. Normally, if conduction heat is used, the coffee would be heated to 300 to 500 degrees Fahrenheit at the three points of contact with the container which will result in a burning of the coffee located in the particular areas in the container adjacent to the three points of contact. In addition, the conduction heat applied to the container will result in a boiling off of the water in the coffee which will render the coffee unfit for consumption. The present invention avoids the problems of the prior art to provide coffee or soup that is maintained at a predetermined temperature without burning or boiling off the product to make it unacceptable for consumption.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A radiant liquid heating container comprising:
an enclosure adapted to hold a liquid;
said enclosure includes a closed bottom, an outer portion and an opening for adding or extracting said liquid;
a base shell including a bottom member and an outer circumferential surface projecting upwardly from the bottom member a predetermined distance to a top portion;
wherein said base shell has a higher curvature than a curvature of said closed bottom of said enclosure, in a perpendicular direction with respect to a plane of the bottom member of said base shell, forming a continuous air gap between said bottom member of said base shell and said bottom of said enclosure without any point contact between the curvature of the base shell and the bottom of the enclosure;
said base shell and said enclosure intersect each other at the top of said base shell wherein the outer circumferential surface projecting upwardly a predetermined distance from the bottom member of the base shell extends upwardly the predetermined distance on the outer portion of the enclosure;
wherein said continuous air gap is formed between said bottom member of said base shell and said bottom of said enclosure without any point contact between the curvature of the base shell and the bottom of the enclosure and said continuous air gap is formed between the outer circumferential surface projecting upwardly the predetermined distance and the outer portion of said enclosure without any point contact between the outer circumferential surface projecting upwardly the predetermined distance and the outer portion of the enclosure and said top portion of said base shell is sealed at the point of intersection of the top portion of said base shell and said outer portion of the enclosure with a heat resistant material to avoid point contact of said base shell with said enclosure to avoid spot heating of a liquid within said enclosure by providing the continuous air gap between the bottom member of the base shell and the bottom of said enclosure without any point contact between the curvature of the base shell and the bottom of the enclosure and the continuous air gap between the outer circumferential surface projecting upwardly the predetermined distance and the outer portion of said enclosure without any point contact between the outer circumferential surface projecting upwardly the predetermined distance and the outer portion of the enclosure.

2. The radiant liquid heating container as recited in claim 1, wherein said base shell is made of metal.

3. The radiant liquid heating container as recited in claim 1, wherein said base shell is made of aluminum.

4. The radiant liquid heating container as recited in claim 1, wherein said enclosure is made of glass.

5. The radiant liquid heating container as recited in claim 1, wherein interior surface of said base shell is coated with a non-reflecting material.

6. The radiant liquid heating container as recited in claim 1, wherein interior surface of said base shell is coated with black paint.

7. The radiant liquid heating container as recited in claim 1, wherein said seal is made of plastic.

8. The radiant liquid heating container as recited in claim 1, wherein said seal is made of silicone.

9. The radiant liquid heating container as recited in claim 1, wherein said enclosure is made of metal.

10. The radiant liquid heating container as recited in claim 1, wherein said liquid is coffee.

11. The radiant liquid heating container as recited in claim 1, wherein said base shell has a circular cross section.

12. The radiant liquid heating container as recited in claim 1, wherein said base shell is placed between a heat source and said bottom of said enclosure.

13. The radiant liquid heating container as recited in claim 1, wherein interior surface of said base shell is coated with a dark material.

14. The radiant liquid heating container as recited in claim 1, wherein said enclosure has a circular cross section.

15. The radiant liquid heating container as recited in claim 1, wherein said handle is attached or affixed to top of said enclosure.

16. The radiant liquid heating container as recited in claim 1, wherein said liquid's temperature is held at a constant temperature.

17. The radiant liquid heating container as recited in claim 1, wherein said liquid is substantially heated through radiant heat.

18. The radiant liquid heating container as recited in claim 1, wherein said liquid's temperature is held at a predetermined temperature.

19. The radiant liquid heating container as recited in claim 1, said liquid heating container comprises one or more spacers.

* * * * *